(12) United States Patent
Tanaka (10) Patent No.: US 7,359,473 B2
(45) Date of Patent: Apr. 15, 2008

(54) COMMUNICATION DEVICE

(75) Inventor: Nobuyuki Tanaka, Nukata-gun (JP)

(73) Assignee: DENSO CORPORATION, Kariya (JP)

( * ) Notice: Subject to any disclaimer, the term of this patent is extended or adjusted under 35 U.S.C. 154(b) by 676 days.

(21) Appl. No.: 10/862,320

(22) Filed: Jun. 8, 2004

(65) Prior Publication Data
US 2004/0264620 A1    Dec. 30, 2004

(30) Foreign Application Priority Data
Jun. 24, 2003   (JP) ............................ 2003-179619

(51) Int. Cl.
*H03D 3/24* (2006.01)
(52) U.S. Cl. .................... 375/375; 327/291
(58) Field of Classification Search ............... 375/375, 375/354, 371; 327/291
See application file for complete search history.

(56) References Cited
U.S. PATENT DOCUMENTS
5,787,132 A    7/1998  Kishigami et al.
6,643,346 B1 *  11/2003  Pedrotti et al. ............. 375/375
2004/0071251 A1 *  4/2004  Sutioso et al. ............. 375/373

FOREIGN PATENT DOCUMENTS
JP        B-2-17080        4/1990

* cited by examiner

*Primary Examiner*—Jean B. Corrielus
(74) *Attorney, Agent, or Firm*—Posz Law Group, PLC

(57) ABSTRACT

In a communication device, a counter counts a reference clock CLK1 at each edge of a data signal, and a clock generator generates a reception clock corresponding to the count value of the counter. When there is a frequency lag between the reception clock and the frequency of the transmission clock at a communication partner side, the count value when an edge detection signal is at a H-level is deviated from the count value. This deviation reflects decode signals DS1 to DS3, and phase delay or phase advance is detected on the basis of a signal P1 or P2. At this time, the estimated value of the next edge period is increased/reduced by only "1". When the deviation of the count value occurs sequentially, a frequency excessively-small state or excessively-large state is detected on the basis of the signal F1 or F2. At this time, the estimated count value of the next edge period is increased/reduced by only "2".

11 Claims, 5 Drawing Sheets

COMMUNICATION DEVICE

CROSS REFERENCE TO RELATED APPLICATION

This application is based upon, claims the benefit of priority of, and incorporates by reference the contents of Japanese Patent Application No. 2003-179619 filed on Jun. 24, 2003.

FIELD OF THE INVENTION

The present invention relates to a communication device having a data reception unit for receiving transmission data comprising a bit sequence transmitted in synchronism with a transmission clock of a device at a communication partner side, and a reception clock generating unit for generating a reception clock synchronism with the transmission data and supplying the reception clock to the data reception unit.

BACKGROUND OF THE INVENTION

JP-B-2-17080 discloses a technique on a direction finding machine for detecting the difference in phase between a reference signal and a direction signal of electric waves based on reception signals achieved by successively switching and sweeping an antenna group to carry out a direction measurement, and correcting a direction error caused by a signal delay of a reception circuit or the like by presetting a correction value into a counter which can be preset.

JP-A-8-98284 discloses a data reception device for detecting a reference pulse contained in received transmission data by utilizing the fact that the reference pulse concerned corresponds to the period of a transmission clock for encoding the transmission data, and measuring the pulse width of the reference pulse on the basis of a reference clock to generate a reception clock having the same communication speed as the transmission data. According to the data reception device, even when the pulse width of the reference pulse is not accurately equal to an integral multiple of the reference clock, and thus a phase lag of the reference pulse is gradually accumulated, a reception clock generator is reset in conformity with the variation point of the transmission data, that is, the bit boundary of the transmission data, so that the start of frequency-division of the reference clock is coincident with the variation point of the transmission data and the reception clock and the transmission data can be made coincident in phase with each other.

When the data reception mechanism disclosed in JP-A-8-98284 is used, a reception clock synchronous with the phase of transmission data can be generated, and even when a frequency lag exists between a reference clock used at the transmission side and a reference clock used at the reception side, the communications can be performed if the frequency lag is minute. However, when the frequency lag between these reference clocks is increased (for example, by about 2%), the accumulation error of the phase is rapidly increased with time lapse of the communication time, and thus the correction of the phase by using only the data reception mechanism cannot follow the rapid increase of the accumulation error, so that dropouts of bits may occur in the reception data. Therefore, in the conventional communication device, the reference clock is generated by using a high-precision and highly-stable quartz oscillation circuit.

The quartz oscillation circuit is more expensive than a ceramic oscillator, etc. Therefore, for the purpose of reducing the cost, it has been required to use a ceramic oscillation circuit or a CR oscillation circuit which is lower in precision, but has a larger effect in reduction of the cost.

SUMMARY OF THE INVENTION

The present invention has been implemented in view of the foregoing situation, and has an object to provide a communication device which can surely perform communications with no error even when a frequency lag exists between the reference clock at the transmission side and the reference clock at the reception side.

In order to attain the above object, according to a first aspect of the present invention, a reception clock generating unit generates a reception clock by utilizing the fact that the interval of signal level variation points of transmission data received (or the width of each bit of a bit sequence) corresponds to the period of a transmission clock which is transmitted and used in a communication partner side, and a data reception unit receives transmission data in synchronism with the reception clock thus generated.

When a phase lag detection unit detects the phase lag between the transmission data and the reception clock in accordance with the signal level variation points of the transmission data, a phase correcting unit corrects the phase of the reception clock. Accordingly, a mere phase lag or a phase lag caused by a relatively small frequency lag between the transmission clock used in the transmission-side device and the reception clock used in the communication device of the present invention can be corrected.

Furthermore, when the phase lag is sequentially detected by the phase lag detecting unit, a frequency lag detecting unit detects that a frequency lag exists between the transmission clock of the device at the communication partner side and the reception clock, and a frequency correcting unit corrects the frequency of the reception clock. Accordingly, even when there exists a relatively large frequency lag which cannot be corrected by using only conventional phase correction, communications can be surely performed with no error.

According to a second aspect of the present invention, a counter equipped to the reception clock generating unit measures the interval of the signal level variation points of the transmission data by counting the reference clock. The reception clock is generated on the basis of the count value thus counted. The frequency of the reference clock is appropriately determined on the basis of the communication speed, the resolution of the count value, etc.

According to a third aspect of the present invention, the phase lag detecting unit compares (containing "decodes") the count value of the counter at the signal level variation points of the transmission data with an estimated count value to detect the phase lag between the transmission data and the reception clock. An up-count case will be described as an example. When the count value at the signal level variation points of the transmission data is smaller than the estimated count value, it means that the phase of the reception clock is delayed. In this case, the phase correcting unit reduces the estimated count value by only $X(\geqq 1)$ to match the phase between the transmission data and the reception clock by the period of the reference clock as a unit. According to this aspect, the time from the detection of the phase lag till the completion of the phase correction is very short (for example, 1-bit width). Therefore, stable communications can be performed.

According to a fourth aspect of the present invention, the phase lag detecting means detects a phase lag amount by the period of the reference clock as a unit, and the phase correcting unit increases/reduces the estimated count value in accordance with the phase lag amount thus detected. Therefore, even when the phase lag is large, the phase lag can be corrected in a short time.

According to a fifth aspect of the present invention, when the frequency lag detecting unit detects a frequency lag, the frequency correcting unit increases/reduces the estimated count value by only Y. Here, The value Y increased or reduced is set to a value larger than the correction value X when the phase correction is carried out. Accordingly, the lag which cannot be corrected by only the phase correction (i.e., which is judged as a frequency lag) can be surely corrected. In this case, the frequency lag can be corrected in an extremely short time by the period of the reference clock as a unit.

According to a sixth aspect of the present invention, the frequency correcting unit adjusts the count value of the counter so that the duty ratio of the reception clock is held to a predetermined value. For example, in the case of 50% duty ratio, the same increasing/reducing processing may be carried out on each of the count value corresponding to the L-level period of the reception clock and the count value corresponding to the H-level period of the count value.

According to a seventh aspect of the present invention, when a frequency lag is detected, the reception clock generating unit can also correct the frequency lag by changing the frequency division/multiplication rate when the reference clock is generated from the original oscillation clock. Accordingly, when the frequency division/multiplication rate is in some adjusting resolution range, the correction can be performed at a more minute level than the correction carried out by the period of the reference clock as a unit.

According to an eighth aspect of the present invention, when the frequency of the reception clock is corrected, the frequency correcting unit holds the correction state until next correction is carried out. Accordingly, the frequency of the reception clock can be automatically matched with the transmission clock of the device at the transmission side.

According to a ninth aspect of the present invention, when the frequency lag is detected by the frequency lag detecting unit, the frequency of the transmission clock is also corrected. Therefore, the frequency lag between the transmission clock at the communication device of this invention and the reception clock of the device at the communication partner side can be reduced, and the reception error at the communication partner device side can be reduced.

According to a tenth aspect of the present invention, data is transmitted while the reception clock is directly used as the transmission clock, and thus the transmission clock generating unit is unnecessary.

DETAILED DESCRIPTION OF THE PREFERRED EMBODIMENTS

A preferred embodiment according to the present invention will be described hereunder with reference to the accompanying drawings.

An in-vehicle mount type communication device of this embodiment is accommodated in a case functioning as a seal for a number plate (not shown) at the front side of a vehicle, for example, and it is used in a system such as VICS, ETC or the like which carries out two-way communications with on-road equipment (not shown) equipped in the neighborhood of a traveling road of the vehicle, or a parking management system for allowing the vehicle to park at a prescribed motor park through the communications with on-road equipment.

Figure 2:
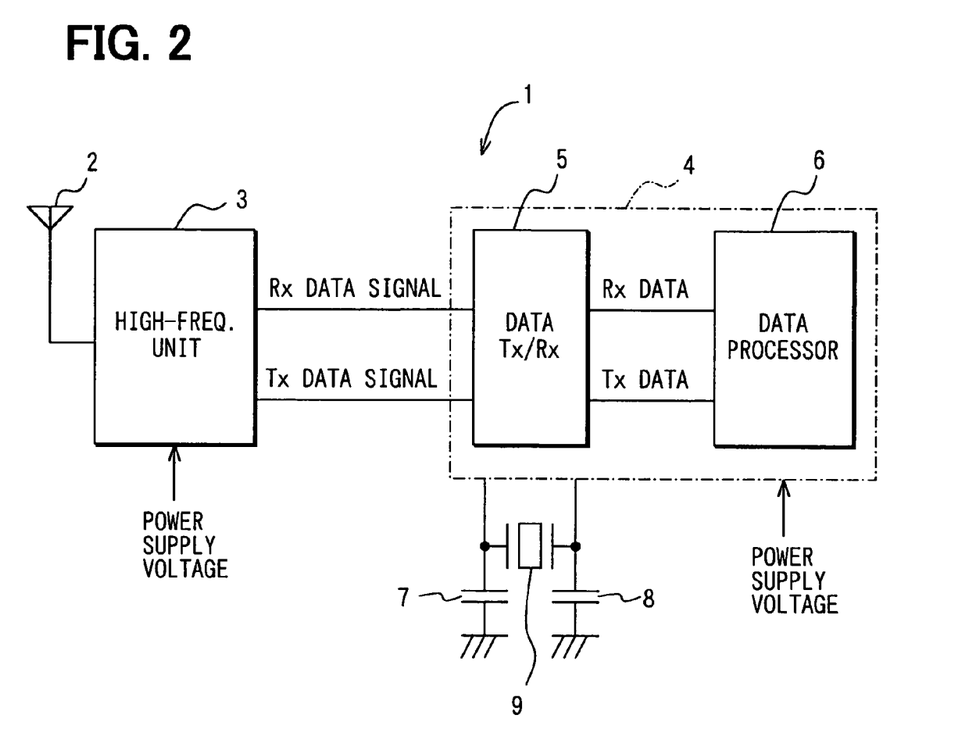
FIG. 2 is a schematic block diagram showing the overall construction of an in-vehicle mount type communication device.

FIG. 2 is a block diagram schematically showing the construction of the in-vehicle mount type communication device described above. The in-vehicle mount type communication device 1 comprises an antenna 2, a high-frequency unit 3 constructed as a single IC, and a communication controller 4 constructed as another IC, and a power supply voltage is supplied from a constant-voltage supply source having a battery voltage input thereto or a battery (not shown) to the in-vehicle mount type communication device 1 to operate the communication device 1. The high-frequency unit 3 carries out two-way communications of 5.8 GHz active system based on the DSRC (Dedicated Short Range Communication) standard with the on-road equipment, and is equipped with a modulation/demodulation circuit of ASK modulation (or QPSK modulation). The IC of the communication controller 4 is externally equipped with capacitors 7, 8 and a ceramic oscillator 9. The communication controller 4 comprises a data transmission/reception unit 5 (corresponding to the communication device of this invention) for transmitting/receiving a base band signal, and a data processor 6 for processing transmission/reception data.

Figure 1:
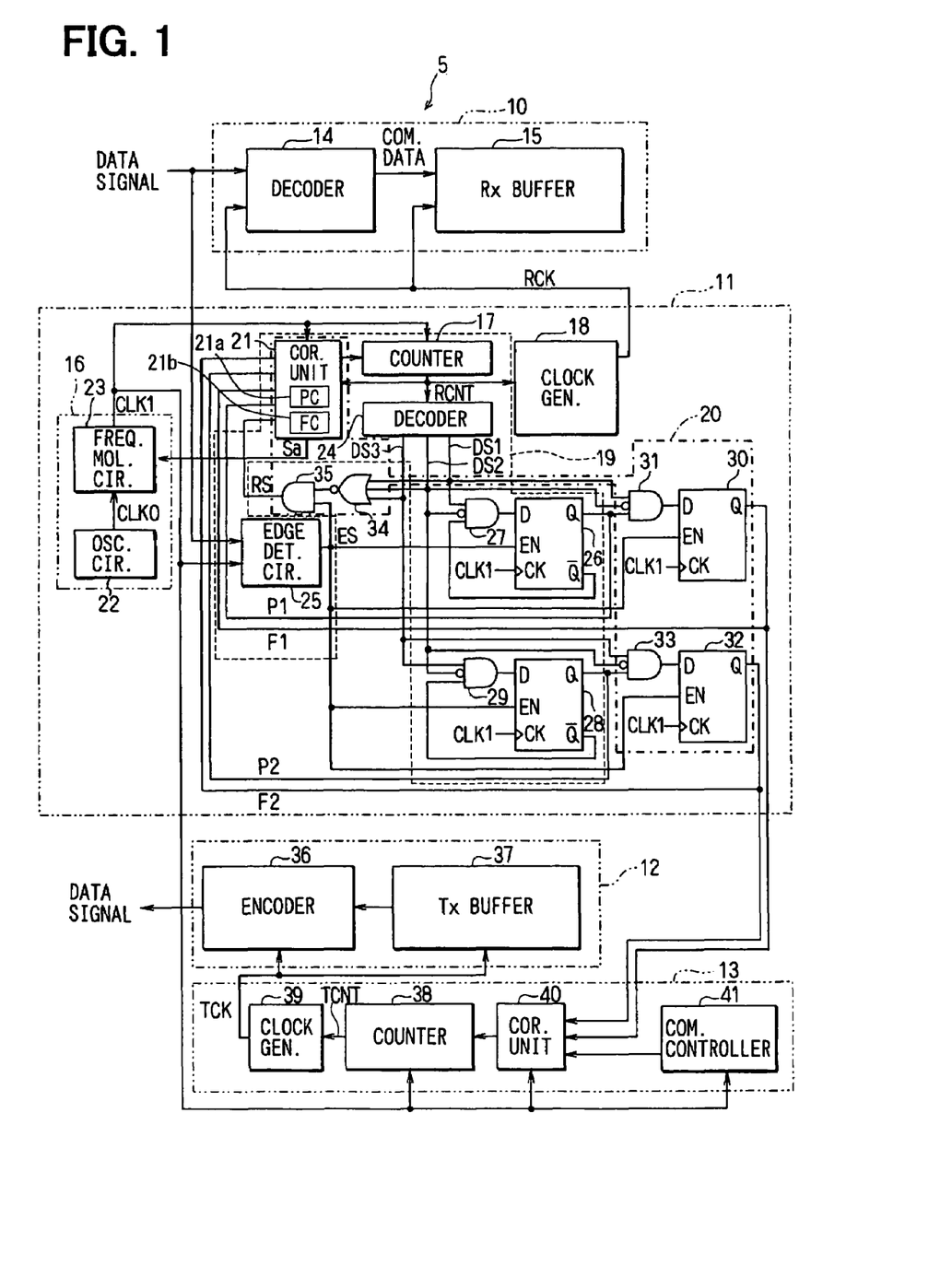
FIG. 1 is a diagram showing the construction of a data transmission/reception unit according to an embodiment of the present invention.

FIG. 1 shows the construction of the data transmission/reception unit 5. The data transmission/reception unit 5 comprises a data receiver 10, a reception clock generator 11, a data transmitter 12 and a transmission clock generator 13. These elements correspond to a data receiving unit, a reception clock generating unit, a data transmitting unit and a transmission clock generating unit of the present invention. The construction of each element will be described hereunder.

The data receiver 10 comprises a decoder 14 and a reception buffer 15. The decoder 14 is supplied with a base band signal encoded with Manchester codes (hereinafter referred to as data signal") from the high-frequency unit 3, and decodes the data signal in synchronism with a reception clock RCK described later. The reception data thus decoded are stored into the reception buffer 15 having the shift register structure bit by bit.

The reception clock generator 11 generates the reception clock RCK synchronous with the data signal, and it comprises a clock generating circuit 16 (corresponding to a reference clock generating unit), a counter 17, a clock generator 18, a phase lag detector 19 (corresponding to a phase lag detecting unit), a frequency lag detector 20 (corresponding to a frequency lag detecting unit) and a controller 21 (corresponding to a phase correcting unit, a frequency correcting unit). The phase correcting unit is illustrated by PC 21a and the frequency correcting unit is illustrated by FC 21b. Although the PC 21a and the FC 21b are illustrated separately, these units may possibly share some components.

The clock generating circuit 16 comprises an oscillating circuit 22 for oscillating an original oscillation clock CLK0 by using the ceramic oscillator 9, and a clock frequency multiplying circuit 23 for multiplying the frequency of the clock CLK0 and outputting a clock CLK1 (corresponding to a reference clock). In this embodiment, the ceramic oscillator 9 is adopted in place of the quartz oscillator in order to reduce the manufacturing cost, so that the frequencies of the clocks CLK0, CLK1 are varied by about 2% at maximum because of dispersion among products in the ceramic oscillator 9, time-dependent variation, temperature variation, etc.

Furthermore, the communication speed and the frequency of the clock CLK0 used in this embodiment are equal to 1 Mbps and 4 MHz, respectively. Therefore, the clock frequency multiplying circuit 23 quadruples the frequency of the clock CLK0 to generate the frequency of the clock CLK0 of 16 MHz according to a frequency multiplying signal Sa supplied from the controller 21 so that a standard count value when the counter 17 counts the edge interval of the data signal by using the clock CLK1 is equal to 16. In this embodiment, the frequency multiplying signal Sa is fixed to a quadrupling signal.

The counter 17 is designed as a 5-bit counter for counting its count value at the rise-up edge of the clock CLK1, and the count value RCNT is adjusted by the controller 21. As described later, when no phase lag exists between the data signal and the reception clock RCK, the count value RCNT cyclically repeats the values from 0H to FH. The clock generator 18 decodes (corresponding to "compares") the count value RCNT to generate a reception clock RCK which is set to L level during the period when the count value RCNT ranges from 0H to 7H and to H level during the period when the count value ranges from 8H to FH.

The phase lag detector 19 detects the phase lag between the data signal and the reception clock RCK at the level variation points (edges) of the data signal with the period TCLK1 (62.5 ns) of the clock CLK1 as a measuring unit (resolution). The phase lag in this case corresponds to the time lag between the time point of the level variation of the data signal and the time point when the count value RCNT of the counter 17 reaches the estimated count value corresponding to 1-bit width. In the following description, "delay" of phase means a state where the count value RCNT does not reach the estimated count value at the time point of the level variation of the data reception, and "advance" of phase means a state where the count value RCNT is over the estimated count value at the time point of the level variation of the data signal.

A decoder 24 is designed to decode the count value RCNT and output decode signals DS1, DS2, DS3. Here, the decode signal DS1 is set to H level during only the period when the count value RCNT ranges from CH to FH, the decode signal DS2 is set to H level during only the period when the count value RCNT is equal to 0H (containing 10H when 10H exists), and the decode signal DS3 is set to H level during only the period when the count value RCNT ranges from 1 to 4. An edge detection circuit 25 samples the data signal at the rise-up edges of the clock CLK1, and sets the edge detection signal ES to H level for only one period of the clock CLK1 when the level of the data signal is different from that at the preceding sampling time.

A D type flip-flop circuit 26 operates with the clock CLK1 as a synchronous clock. When a phase-delayed state occurs at the time point of the level variation of the data signal, it outputs a phase delay signal P1 of H level from the output terminal Q thereof during the period from that time till the next level variation point (see FIG. 3). The edge detection signal Es is input to the enable terminal EN of the flip-flop circuit 26. An AND circuit 27 generates the AND signal of the decode signal DS1, the inverted signal of the decode signal DS2 and the signal of the output terminal/Q of the flip-flop 26, and the AND signal thus generated is supplied to the data input terminal D of the flip-flop 26.

Likewise, a D-type flip-flop 28 operates with the clock CLK1 as a synchronous clock. When a phase-advanced state occurs at the time point of the level variation of the data signal, it outputs a phase advance signal P2 of H level from the output terminal Q thereof during the period from that time till the next level variation point (see FIG. 4). The edge detection signal ES is input to the enable terminal EN. An AND circuit 29 generates the AND signal of the inverted signal of the decode signal DS2, the decode signal DS3 and the signal of the output terminal/Q of the flip-flop 28, and the AND signal is supplied to the data input terminal D of the flip-flop 28.

When the phase lag is sequentially detected twice, the frequency lag detector 20 detects the frequency lag between the transmission clock used by the communication device of on-road equipment transmitting the data signal and the reception clock RCK. In the following description, "low-frequency state" means a state where the frequency of the reception clock RCK is lower than the frequency of the transmission clock at the on-road equipment, and "high-frequency state" means a state where the frequency of the reception clock RCK is higher than the frequency of the transmission clock at the on-road equipment.

A D-type flip-flop 30 operates with the clock CLK1 as a synchronous clock. When the low-frequency state occurs, it outputs a frequency excessively small signal F1 of H level from the output terminal Q thereof during the period from that time till the next data signal level variation point (see FIG. 3). The edge detection signal ES is input to the enable terminal EN. An AND circuit 31 generates the AND signal of the decode signal DS1, the inverted signal of the decode signal DS2 and the phase delay signal P1, and the AND signal thus generated is supplied to the data input terminal D of the flip-flop 30.

Likewise, a D-type flip-flop 32 operates with the clock CLK1 as a synchronous clock. When the high frequency state occurs, it outputs a frequency excessively large signal F2 of H level from the output terminal Q thereof during the period from that time till the next data signal level variation point (see FIG. 4). The edge detection signal ES is input to the enable terminal EN. An AND circuit 33 generates the AND signal of the inverted signal of the decode signal DS2, the decode signal DS3 and the phase advance signal P2, and the AND signal thus generated is supplied to the data input terminal D of the flip-flop 32.

Furthermore, the decode signals DS1, DS2 and DS3 are input to an NOR circuit 34, and an AND circuit 35 outputs the initializing signal RS corresponding to the AND signal of the output signal of the NOR circuit 34 and the edge detection signal ES.

The controller 21 adjusts the count value RCNT on the basis of the phase delay signal P1, the phase advance signal P2, the frequency excessively small signal F1, the frequency excessively large signal F2, the initializing signal RS and the count value RCNT, and corrects the phase lag state or the frequency lag state. That is, when the delay signal P1 is set to H level, the controller 21 decrements the count value RCNT of 1-bit period till the next edge from 16 to 15 by 1 (corresponding to X) to advance the phase of the reception clock RCK. When the phase advance signal P2 is set to H level, the controller 21 increments the count value RCNT of 1-bit period till the next edge from 16 to 17 by 1 (corresponding to X) to delay the phase of the reception clock RCK.

When the frequency excessively small signal F1 is set to H level, the controller 21 reduces the count value of 1-bit period till the next edge from 16 to 14 by only 2 (corresponding to Y) to increase the frequency of the reception clock RCK. On the other hand, when the frequency excessively large signal F2 is set to H level, the controller 21 increases the count value of 1-bit period till the next edge from 16 to 18 by only 2 (corresponding to Y) to reduce the frequency of the reception clock RCK. When the initializing signal RS is set to H level, the count value RCNT is cleared to zero.

The data transmitter 12 comprises an encoder 36 and a transmission buffer 37. The encoder 36 is supplied with the transmission data from the transmission buffer 37 in synchronism with a transmission clock TCK described later to encode the transmission data thus supplied with Manchester codes and output a base band signal (data signal).

The transmission clock generator 13 generates the transmission clock TCK synchronous with the data signal, and it comprises a counter 38, a clock generator 39, a controller 40 (corresponding to the frequency correcting unit) and a transmission start controller 41. The counter 38 comprises a 5-bit counter for counting up the count value at the rise-up edge of the clock CLK1, and the count value TCNT thereof is adjusted by the controller 40. The clock generator 39 decodes the count value TCNT, and generates the transmission clock TCK which is set to L level during the period when the count value TCNT ranges from 0H to 7H and to H level during the period when the count value TCNT ranges from 8H to FH.

The controller 40 adjusts the count value TCNT on the basis of the frequency excessively small signal F1 and the frequency excessively large signal F2 to correct the frequency lag state. That is, when the frequency excessively small signal F1 is set to H level, the controller 40 reduces the count value of 1-bit period till the next edge from 16 to 14 by only 2 to increase the frequency of the transmission clock TCK. On the other hand, when the frequency excessively large signal F2 is set to H level, the controller 40 increases the count value of 1-bit period till the next edge from 16 to 18 by only 2 to reduce the frequency of the transmission clock TCK. The transmission start controller 41 controls the delayed interval between the data reception and the data transmission on the basis of an instruction from CPU (not shown).

The operation of the data transmission/reception unit 5 will be described with reference to FIGS. 3 and 4.

Figure 3:
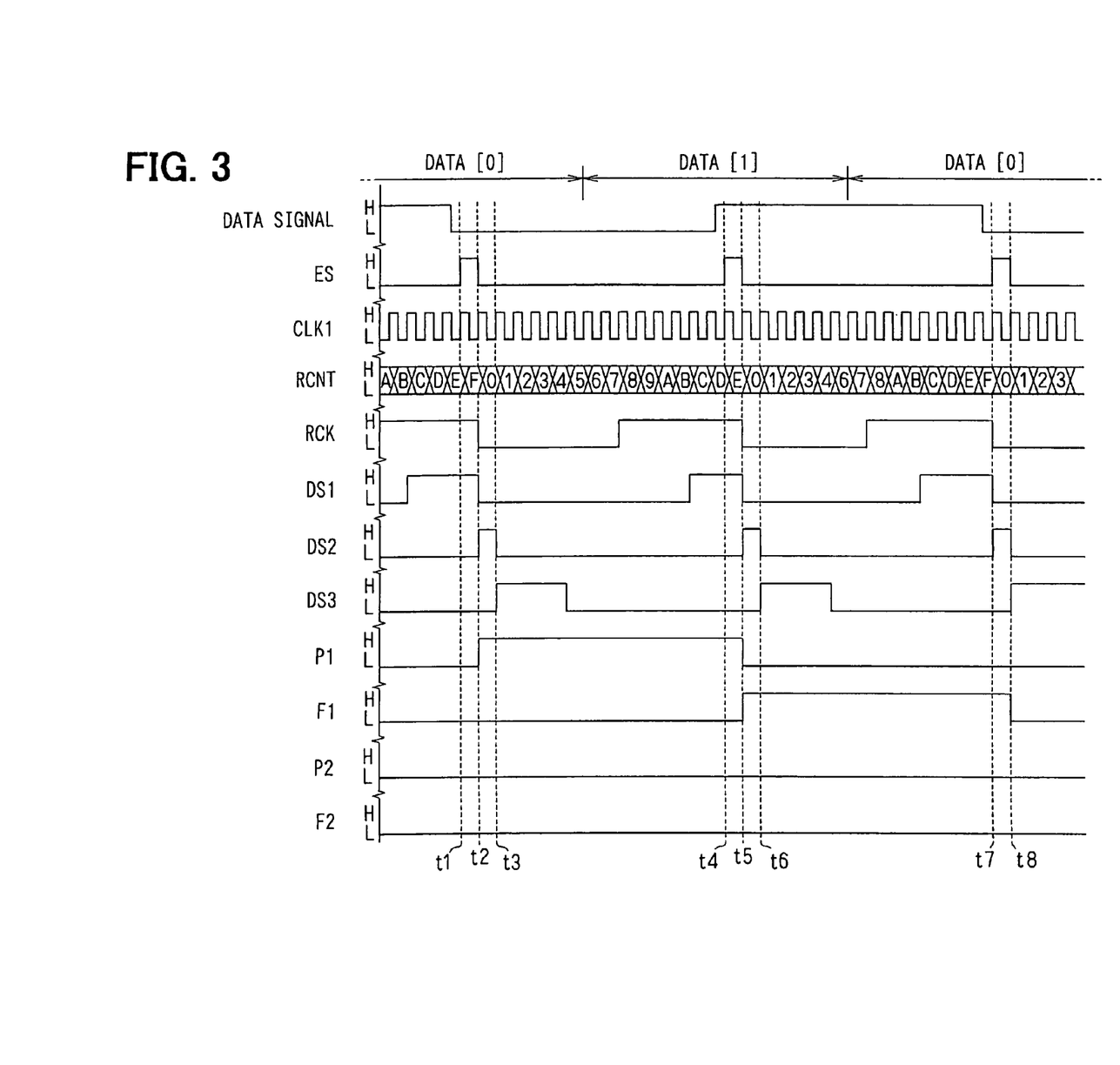
FIG. 3 is signal timing chart for when the frequency of a reception clock RCK is lower than the frequency of a transmission clock at on-road equipment side.
Figure 4:
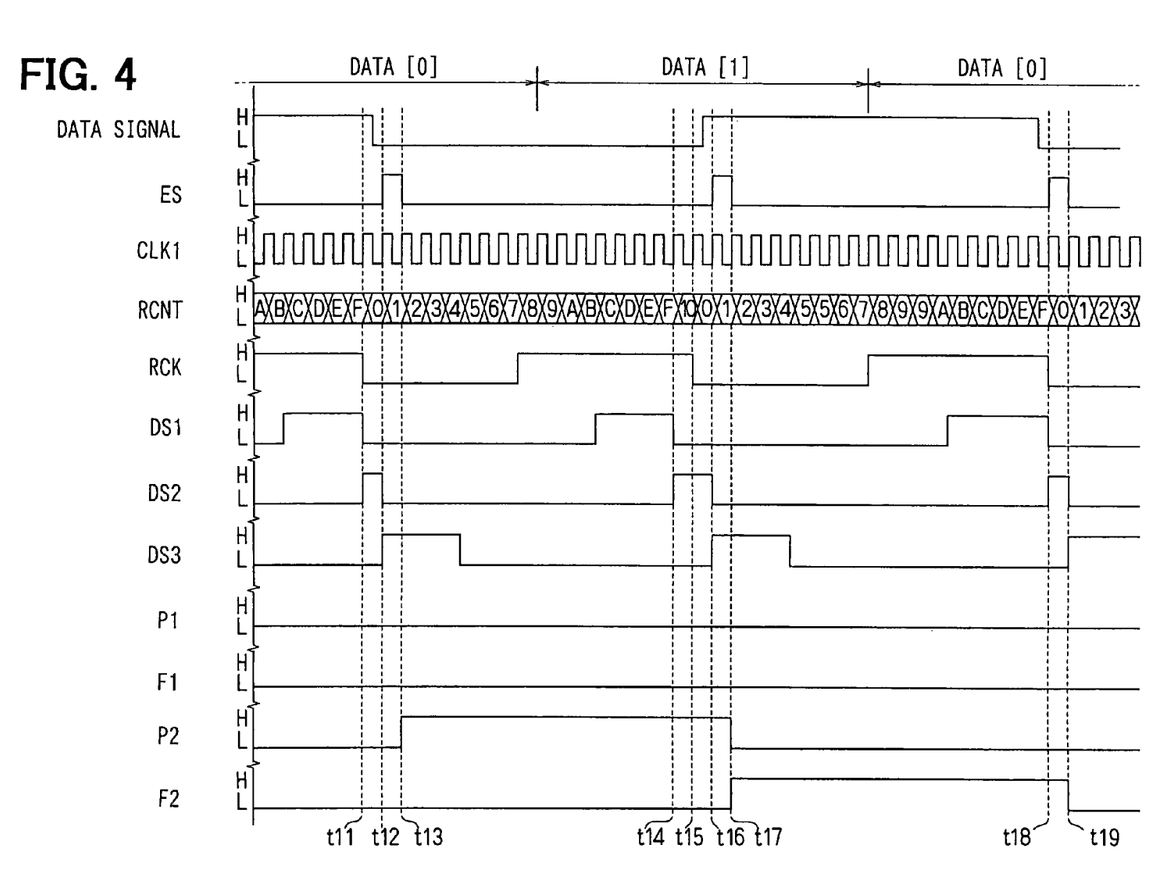
FIG. 4 is a signal timing chart for when the frequency of the reception clock RCK is higher than the frequency of the transmission clock at the on-road equipment side.

FIG. 3 is a timing chart of each signal when the frequency of the reception clock RCK is lower than the frequency of the transmission clock at the on-road equipment side, and FIG. 4 is a timing chart showing each signal when the frequency of the reception clock RCK is higher than the frequency of the transmission clock at the on-road equipment side. In FIGS. 3 and 4, (a) to (l) represent the following signals.

(a). received data signal (base band signal)
(b). edge detection signal ES
(c). clock CLK1
(d). count value RCNT of counter 17
(e). reception clock RCK
(f). decode signal DS1
(g). decode signal DS2
(h). decode signal DS3
(i). phase delay signal P1
(j). frequency excessively small signal F1
(k). phase advance signal P2
(l). frequency excessively large signal F2

The data signal is encoded with the Manchester codes. The case where the data signal is varied from H level to L level corresponds to data "0", and the case where the data signal is varied from L level to H level corresponds to data "1". In this embodiment, the 1-bit width of the data signal means the width of each bit of the data signal, and when the data is varied like 0, 1, 0, 1, . . . , the 1-bit width is equal to the interval of the level variation points (edge interval) of the data signal.

On the other hand, when the same data are continued like 0, 0, . . . or 1, 1, . . . , the edge interval is equal to a half of the 1-bit width. An edge appearing at the midpoint of the 1-bit width causes an error in the phase lag detection or frequency detection using the estimated count value corresponding to the 1-bit width. Therefore, after synchronization is established by using the synchronous bit of each slot, the edge detection circuit 25 masks the edge appearing at the midpoint and controls the edge concerned so that the edge detection signal is not set to H level.

When the frequency of the reception clock RCK is equal to the frequency of the transmission clock at the on-road equipment side and also no phase lag occurs between the data signal and the reception clock RCK at the level variation point (edge) of the data signal, the count value RCNT during the period when the edge detection signal ES is equal to H level is equal to 0H, and the decode signal DS2 is set to H level.

On the other hand, when the frequency of the reception clock RCK is lower than the frequency of the transmission clock at the on-road equipment side and thus the phase appears to be delayed or when the frequencies are coincident with each other and the phase is merely delayed, the count value RCNT during the period when the edge detection signal ES is equal to H level is equal to FH (or EH, DH, CH) before it reaches the estimated count value 0H, and the decode signal DS1 is set to H level.

Conversely, when the frequency of the reception clock RCK is higher than the frequency of the transmission clock at the on-road equipment side and thus the phase appears to advance or when the frequencies are coincident with each other and the phase advances merely, the count value RCNT during the period when the edge detection signal ES is equal to H level is equal to 1H (or 2H, 3H, 4H) which exceeds the estimated count value 0H, and the decode signal DS3 is set to H level.

Accordingly, the phase lag detector 19 having the flip-flops 26, 28 receives the decode signals DS1, DS2, DS3 with the edge detection signal ES as the enable signal, so that the phase delay or phase advance can be detected as the phase delay signal P1 or the phase advance signal P2. When the phase delay or phase advance is detected in connection with the next edge of the data signal during the period when the phase delay signal P1 or the phase advance signal P2 has the H level because the phase delay or phase advance is detected, the frequency lag detector 20 having the flip-flops 30, 32 can detect the frequency excessively small state or frequency excessively large state on the basis of the frequency excessively small signal F1 or frequency excessively large signal F2. That is, when the phase delay or phase advance is detected, the phase is corrected as described later.

When the phase delay or phase advance is sequentially detected in spite of the correction of the phase, it is judged that the phase delay or phase advance is not caused by a mere phase lag, but caused by a frequency lag itself.

The operation shown in FIG. 3 will be described on the basis of the above detection principle. In this case, since the frequency of the reception clock RCK is lower than the frequency of the transmission clock at the on-road equipment side, the reception clock RCK appears as if the phase thereof is kept to be delayed. That is, the count value RCNT is set to FH and the decode signal DS is set to H level during the period (time t1 to time t2) when the edge detection signal ES is set to H level. The flip-flop 26 is supplied with the data of the H level to set the phase delay signal P1 to H level (time t2).

The phase adjustment to the phase lag is carried out by reducing the estimated count value during the next 1-bit period of the counter 17 by only "1". That is, at a time t5, the count value RCNT is varied to 0H without passing from EH through FH. As a result, when the frequency lag is relatively small (different from the case of FIG. 3), the count value RCNT is not equal to FH, but equal to 0H during the period (from t4 to t5) when the edge detection signal ES is equal to H level, and the phase lag is corrected while the correction of the frequency lag does not function.

On the other hand, when the frequency lag is relatively large as shown in FIG. 3, the phase adjustment described above cannot follow this frequency lag, and the phase of the reception clock RCK is kept to be further delayed until the next edge. In this case, the count value RCNT is set to EH and the decode signal DS1 is set to H level during the period (from t4 to t5) when the edge detection signal ES is equal to H level. The flip-flop 30 is supplied with this H-level data through the AND circuit 31 to set the frequency excessively small signal F1 to H level (t5).

The frequency adjustment to this frequency lag is carried out by reducing the estimated value in the next 1-bit period of the counter 17 by only "2". This adjustment is carried out by excluding the count value 5H corresponding to the L level of the reception clock RCK and the count value 9H corresponding to the H level of the reception clock RCK in order to keep the duty ratio of the reception clock RCK to 50%. That is, the count value RCNT is varied from 4H to 6H in connection with the count of the clock CLK1, and then varied from 8H to AH. As a result, the count value RCNT in the next H-level period of the edge detection signal ES (from t7 to t8) is equal to 0H, and the frequency lag is corrected.

Next, the time charts of FIG. 4 will be described. In this case, since the frequency of the reception clock RCK is higher than the frequency of the transmission clock at the on-road equipment side, the reception clock RCK appears as if the phase thereof advances. That is, the count value RCNT is equal to 1H and the decode signal DS3 is set to H level during the period (from t12 to t13) when the edge detection signal ES is set to H level. The flip-flop 28 is supplied with this H-level data to set the phase advance signal P2 to H level (t3).

The phase adjustment to this phase lag is carried out by increasing the estimated value in the next 1-bit period of the counter 17 by only "1". That is, at t14, the count value RCNT is varied from FH to 10H which is not normally taken, and then varied to 0H at t15. As a result, when the frequency lag is relatively small, the count value RCNT is not equal to 1H, but equal to 0H in the period (from t14 to t16) when the edge detection signal ES is set to H level, and thus the phase lag is corrected while the correction of the frequency lag does not function.

On the other hand, when the frequency lag is relatively large as shown in FIG. 4, the phase adjustment described above cannot follow the frequency lag, and thus the reception clock RCK is kept to be further advanced in phase until the next edge. In this case, the count value RCNT is equal to 1H and the decode signal DS3 is equal to H level in the period (from t16 to t17) when the edge detection signal ES is equal to H level. The flip-flop 32 is supplied with this H-level data to set the frequency excessively-large signal F2 to H level (t17).

The frequency adjustment to the frequency lag is carried out by increasing the estimated count value in the next 1-bit period of the counter 17 by only "2". This adjustment is carried out by adding the count value 5H corresponding to the L level of the reception clock RCK and the count value 9H corresponding to the H level of the reception clock RCK in order to keep the duty ratio of the reception clock RCK to 50%. That is, the count value RCNT is varied from 4H to 5H, 5H, 6H ... in connection with the count of the clock CLK1, and then varied from 8H to 9H, 9H, AH .... As a result, the count value RCNT in the next H-level period (from t18 to t19) of the edge detection signal is equal to 0H, and thus the frequency lag is corrected.

The foregoing description is associated with the correction of the reception clock RCK. The transmission clock and the reception clock used by the communication device of the on-road equipment are generated by using one reference clock. Therefore, the transmission clock TCK may be corrected in the in-vehicle mount type communication device 1 in the same manner as the reception clock RCK. However, at the in-vehicle mount type communication device 1 side, the data transmission/reception unit 5 can transmit data in any phase in synchronism with the transmission clock TCK, and thus it is unnecessary to correct the phase lag.

As described above, the in-vehicle mount type communication device 1 of this embodiment generates the reference clock CLK1 corresponding to the predetermined communication speed used for the communications with the on-road equipment, and generates the reception clock RCK on the basis of the reference clock CLK1. Furthermore, it detects the phase lag between the transmission clock at the on-road equipment side and the reception clock RCK on the basis of the data signal (base band signal) received, and automatically corrects the phase lag concerned. Accordingly, when a mere phase lag or a relatively small frequency lag occurs between the transmission clock at the on-road equipment and the reception clock RCK, the phase lag or frequency lag can be corrected by this phase correction.

In addition, the in-vehicle mount type communication device 1 detects the frequency lag on the basis of the fact that the phase lag sequentially occurs twice in the same direction in connection with the edges of the data signal, and automatically corrects the frequency lag. Accordingly, even when there exists a relatively large frequency lag which cannot be corrected by only the phase correction, communications can be surely performed with no error. Since it is possible to perform the automatic frequency correction, the frequency precision of the clock CLK1 can be lowered, and thus a ceramic oscillator (the frequency lag is about 2% at maximum) can be used in place of a quartz oscillator to thereby reduce the cost.

The clock CLK1 is counted by the counter 17 and the phase lag is detected on the basis of the count value RCNT at the time point when the edge of the data signal is detected. The phase correction or frequency correction is carried out by increasing/reducing the estimated count value having the 1-bit width by only "1" or "2". Therefore, the time period from the detection of the phase lag or frequency lag till the completion of the phase correction or frequency correction is very short, and stable communications having no communication error such as dropouts of bits or the like can be performed.

With respect to the transmission clock TCK, the count value TCNT is adjusted on the basis of the detection result of the frequency lag using the data signal received in the same manner as the reception clock RCK, thereby correcting the frequency lag. Accordingly, the frequency lag between the transmission clock TCK and the reception clock used by the communication device of the on-road equipment can be reduced, and occurrence of the communication error in connection with the data reception can be reduced in the communication device of the on-road equipment.

With respect to the state having no phase lag where the count value RCNT is equal to 0H, the phase lag detector 19 can detect the phase lag within the range of the count value RCNT ranging from CH to FH (the range of −25%), and also detect the phase advance in the range of the count value RCNT ranging from 1H to 4H (the range of +25%). In the range over ±25%, the count value RCNT is forcedly cleared to zero by the initializing signal RS, and thus synchronization can be surely achieved in the synchronous bit immediately after the communication is started.

The present invention is not limited to the embodiment described above and shown in the drawings, and the following modification or expansion may be made to the embodiment.

When the phase correction is carried out, the increase/reduction amount of the estimated count value corresponding to the 1-bit width is not limited to "1", and the controller 21 may be designed so that the estimated count value is generally increased/reduced by only "X($\geqq$1)". Furthermore, when the frequency correction is carried out, the increase/reduction amount of the estimated count value is not limited to "1", and the controller 21 may be designed so that the estimated count value is generally increased/reduced by only "Y($\geqq$X)". Furthermore, the increase/reduction amount of the estimated count value may be increased/reduced by the number corresponding to the phase lag amount, and furthermore the frequency lag amount.

The detection range of the phase lag and phase advance is not limited to the range from +25% to −25%. Furthermore, the frequency of the clock CLK1 and the estimated count value may be properly changed in accordance with the communication speed or the like. The oscillating circuit 22 is not limited to an oscillating circuit using a ceramic oscillator 9, and it may be a CR oscillating circuit.

Figure 5:
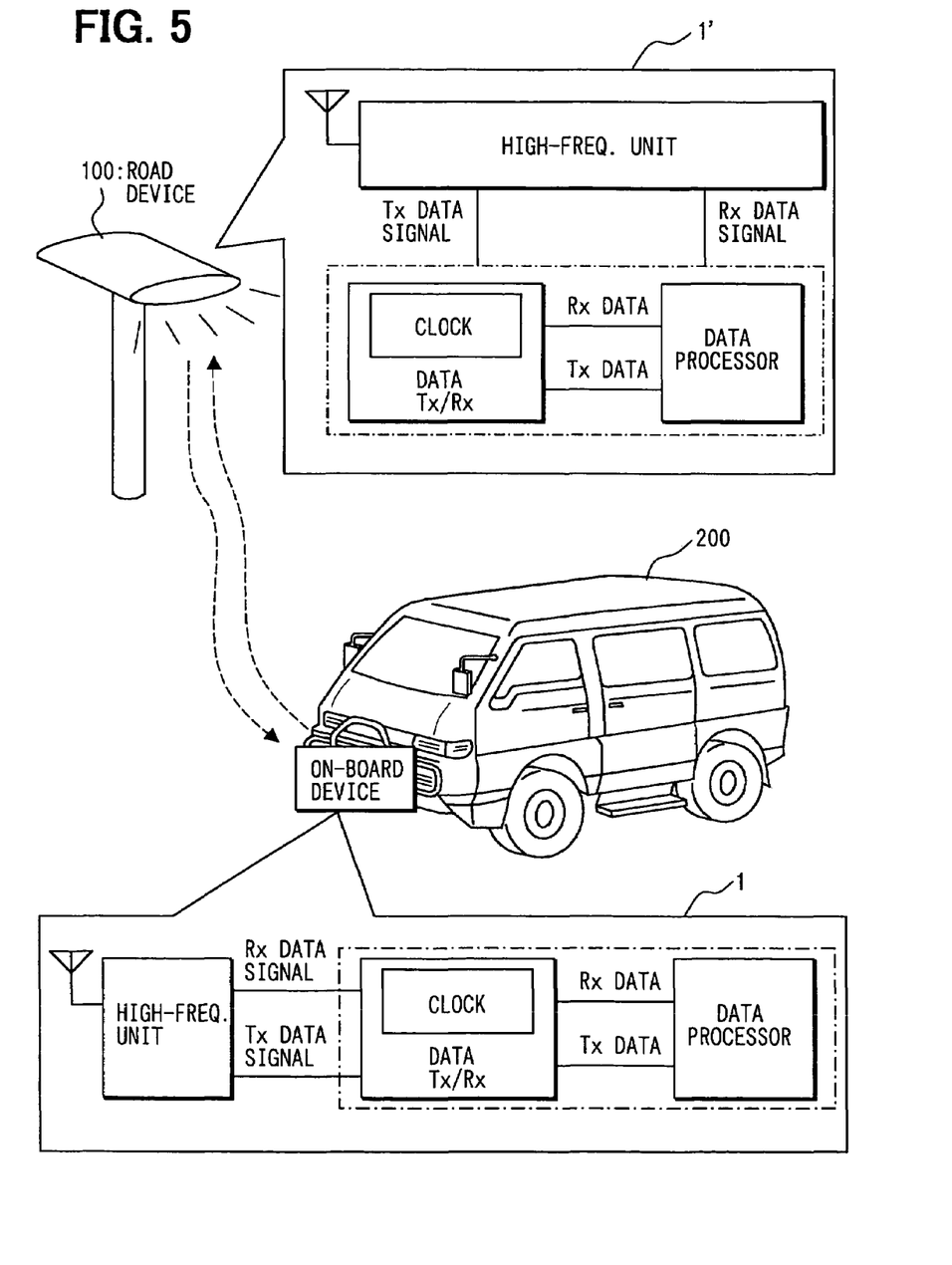
FIG. 5 is a diagram showing a communication system when the phase lag and frequency lag detecting/correcting function of this embodiment is equipped to both the in-vehicle mount type communication device and the communication device of the on-road equipment.

FIG. 5 is a schematic diagram showing a communication system according to another embodiment when the phase lag and frequency lag detecting/correcting function of this embodiment is equipped to both the in-vehicle mount type communication device 1 of for example, a vehicle 200 (on-board device) and the communication device 1' of the on-road equipment (road device) 100.

As shown in FIG. 2, the in-vehicle mount type communication device 1 is equipped with the reception clock generating unit 11 and has the function of detecting/correcting the frequency lag. As shown in FIG. 5, this system is implemented by providing this function to the on-road equipment 100 as well as the in-vehicle mount type communication device 1, thereby performing further stable communications.

When the frequency correction is detected, the frequency of the transmission clock is also corrected, and thus occurrence of the reception error (communication error) due to the data reception can be also reduced at the communication device of the on-road equipment. Therefore, in order to perfectly avoid the communication error, the function of the in-vehicle mount type communication device is also provided to the communication device of the on-road equipment. That is, the frequency error can be absorbed from the communication which directs from the on-road equipment 100 to the in-vehicle mount type communication device 1 of the vehicle 200, and this means that the frequency error can be likewise absorbed from the communication which directs from the in-vehicle mount type communication device 1 to the on-road equipment 100.

For example, in the case where the on-road equipment 100 operates with a normal clock and the in-vehicle mount type communication device 1 operates with a clock delayed with respect to the normal clock of the on-road equipment 100, the in-vehicle mount type communication device 1 receives reception data of a sampling speed higher than the reference clock thereof in the same manner as shown in FIG. 3, and transmits transmission data to the on-road equipment 100 with its own clock (when considered at the on-road equipment side, the transmission data from the in-vehicle mount type communication device 1 are regarded as reception data of a sampling speed lower than the clock at the on-road equipment side). The on-road equipment 100 receives the reception data of a sampling speed lower than the clock thereof in the same manner as shown in FIG. 4.

The embodiments described above may be constructed so that the count value RCNT is adjusted and also the frequency of the clock CLK1 is adjusted by varying the frequency multiplying signal Sa when the frequency lag is detected. Accordingly, the correction can be performed in more minute level than the frequency correction which is carried out in the level corresponding to the period of the clock CLK1.

When the frequency of the reception clock RCK is corrected, the correction state concerned may be held until the next correction is carried out. Accordingly, the frequency of the reception clock RCK can be automatically matched with the transmission clock at the on-road equipment side.

The above embodiment may be modified so that the transmission clock generator 13 is omitted and the reception clock RCK is supplied to the encoder 36 and the transmission buffer 37.

Codes other than the Manchester codes may be used to encode the data signal (base band signal). Furthermore, when the communication device of the present invention is applied to one-way communication, the communication device may be constructed as a reception device having the data receiver 10 and the reception clock generator 11. Furthermore, the present invention is not limited to a wireless communication device, but it is applicable to a wired communication device.

What is claimed is:

1. A communication device comprising a data receiving unit for receiving a transmission data comprised of a bit sequence transmitted in synchronism with a transmission clock of a device at a communication partner side and also comprising a reception clock generating unit for generating a reception clock synchronous with the transmission data and supplying the reception clock to the data receiving unit, wherein the reception clock generating unit comprises:

a phase lag detecting unit for detecting a phase lag between the transmission data and the reception clock in connection with signal level variation points of the transmission data;

a phase correcting unit for correcting the phase of the reception clock when the phase lag is detected by the phase lag detecting unit;

a frequency lag detecting unit for detecting existence of a frequency lag between the transmission clock of the device at the communication partner side and the reception clock on the basis of sequential detection of the phase lag by the phase lag detecting unit; and a frequency correcting unit for correcting the frequency of the reception clock when the frequency lag is detected by the frequency lag detecting unit.

2. The communication device according to claim 1, wherein the reception clock generating unit further comprises a reference clock generating unit for generating a reference clock, and a counter for counting the reference clock to measure the interval between signal level variation points of the transmission data, and generates the reception clock on the basis of the count value.

3. The communication device according to claim 2, wherein the phase lag detecting unit compares the count value of the counter at the signal level variation points of the transmission data with a prescribed estimated count value corresponding to the interval between the signal level variation points of the transmission data to detect the phase lag between the transmission data and the reception clock, and the phase correcting unit increases or reduces the estimated count value by only X when the phase lag is detected, wherein X is greater or equal to 1.

4. The communication device according to claim 3, wherein the phase lag detecting unit detects a phase lag amount by the period of the reference clock as a unit, and the phase correcting unit increases/reduces the estimated count value by the number corresponding to the phase lag amount.

5. The communication device according to claim 3, wherein the frequency correcting unit increases or reduces the estimated count value by only Y when a frequency lag is detected, wherein Y is strictly greater than X.

6. The communication device according to claim 2, wherein the frequency correcting unit adjusts the count value of the counter so that the duty ratio of the reception clock is held to a predetermined value.

7. The communication device according to claim 6, wherein the reference clock generating unit generates the reference clock by dividing or multiplying the frequency of an original oscillating clock according to an instructed frequency division/multiplication rate, and the reception clock generating unit increases/reduces the instruction value of the frequency division/multiplication rate to correct the frequency of the reception clock when a frequency lag is detected.

8. The communication device according to claim 5, wherein the reference clock generating unit generates the reference clock by dividing or multiplying the frequency of an original oscillating clock according to an instructed frequency division/multiplication rate, and the reception clock generating unit increases/reduces the instruction value of the frequency division/multiplication rate to correct the frequency of the reception clock when a frequency lag is detected.

9. The communication device according to claim 1, wherein when the frequency of the reception clock is corrected, the frequency correcting unit holds a present correction state until a next correction is carried out.

10. The communication device according to claim 1, further comprising a transmission clock generating unit for generating a transmission clock and a data transmitting unit for transmitting data in synchronism with the transmission clock generated by said transmission clock generating unit, wherein the transmission clock generating unit is equipped with a frequency correcting unit for correcting the frequency of the transmission clock generated by said transmission clock generating unit when a frequency lag is detected by the frequency lag detecting unit.

11. The communication device according to claim 1, further comprising a data transmitting unit for transmitting data in synchronism with the reception clock.

* * * * *